United States Patent
Jeong et al.

(10) Patent No.: US 10,616,364 B2
(45) Date of Patent: Apr. 7, 2020

(54) ELECTRONIC APPARATUS AND METHOD OF OPERATING THE SAME

(71) Applicant: SAMSUNG ELECTRONICS CO., LTD., Suwon-si, Gyeonggi-do (KR)

(72) Inventors: Da-hee Jeong, Seoul (KR); Se-hyun Kim, Suwon-si (KR); Seung-bok Kim, Gwacheon-si (KR); Jae-im Park, Suwon-si (KR); Kil-soo Choi, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 141 days.

(21) Appl. No.: 15/957,192

(22) Filed: Apr. 19, 2018

(65) Prior Publication Data

US 2018/0352049 A1    Dec. 6, 2018

(30) Foreign Application Priority Data

Jun. 1, 2017    (KR) .................. 10-2017-0068661

(51) Int. Cl.
  *H04L 29/08*    (2006.01)
  *H04L 29/06*    (2006.01)
  (Continued)

(52) U.S. Cl.
  CPC ...... *H04L 67/2847* (2013.01); *H04L 65/4069* (2013.01); *H04L 65/4084* (2013.01);
  (Continued)

(58) Field of Classification Search
  USPC .................................................. 709/231, 219
  See application file for complete search history.

(56) References Cited

U.S. PATENT DOCUMENTS 8,285,121 B2 * 10/2012 Kulas .................... H04N 7/173
                                                          386/278
9,524,450 B2    12/2016 Ravindran et al.
(Continued)

FOREIGN PATENT DOCUMENTS

WO    2016/120694    8/2016

OTHER PUBLICATIONS

Search Report dated Jul. 25, 2018 in counterpart International Patent Application No. PCT/KR2018/004472.
(Continued)

*Primary Examiner* — Jude Jean Gilles
(74) *Attorney, Agent, or Firm* — Nixon & Vanderhye, P.C.

(57) ABSTRACT

An electronic apparatus and a method of operating the same are provided. The electronic apparatus includes: a communication interface comprising communication interface circuitry; a memory storing at least one instruction; and a processor configured to execute the at least one instruction stored in the memory to cause the electronic apparatus to: determine at least one content stream to be pre-fetched; configure a playback pipeline corresponding to the determined at least one content stream considering an available resource of the electronic apparatus; pre-fetch the at least one content stream based on the configured playback pipeline; determine whether to update the pre-fetched at least one content stream based on a type of the pre-fetched at least one content stream; and update the pre-fetched at least one content stream at regular time intervals based on a result of the determining of whether to update.

11 Claims, 10 Drawing Sheets

(51) Int. Cl.
    *H04N 21/2187*    (2011.01)
    *H04N 21/462*     (2011.01)
    *H04N 21/433*     (2011.01)
    *H04N 21/431*     (2011.01)
    *H04N 21/434*     (2011.01)
    *H04N 21/234*     (2011.01)
    *G06F 15/16*      (2006.01)

(52) U.S. Cl.
    CPC ....... *H04N 21/2187* (2013.01); *H04N 21/234* (2013.01); *H04N 21/4316* (2013.01); *H04N 21/4331* (2013.01); *H04N 21/4347* (2013.01); *H04N 21/4622* (2013.01)

(56) References Cited

U.S. PATENT DOCUMENTS

| | | | |
|---|---|---|---|
| 9,628,543 B2 * | 4/2017 | Lim | H04L 67/02 |
| 9,830,946 B2 * | 11/2017 | Mate | H04N 5/772 |
| 2007/0185909 A1 * | 8/2007 | Klein | A63F 13/10 |
| 2007/0199030 A1 * | 8/2007 | Ellis | H04N 5/44543 725/87 |
| 2009/0199241 A1 | 8/2009 | Unger et al. | |
| 2010/0146569 A1 * | 6/2010 | Janardhan | H04N 7/17318 725/98 |
| 2012/0072611 A1 | 3/2012 | Kandekar et al. | |
| 2013/0039632 A1 * | 2/2013 | Feinson | H04N 5/77 386/223 |
| 2013/0129304 A1 * | 5/2013 | Feinson | H04N 13/167 386/223 |
| 2013/0166690 A1 * | 6/2013 | Shatzkamer | H04N 21/25891 709/219 |
| 2014/0026052 A1 | 1/2014 | Thorwirth et al. | |
| 2014/0373032 A1 | 12/2014 | Merry et al. | |
| 2015/0089073 A1 | 3/2015 | Phillips et al. | |
| 2015/0341410 A1 * | 11/2015 | Schrempp | H04L 65/4069 709/231 |
| 2015/0365450 A1 | 12/2015 | Gaunt et al. | |
| 2017/0054800 A1 | 2/2017 | DiVincenzo et al. | |
| 2017/0070757 A1 | 3/2017 | Phillips et al. | |
| 2017/0118508 A1 * | 4/2017 | Mate | H04N 21/21805 |
| 2017/0188116 A1 * | 6/2017 | Major | H04N 21/4334 |
| 2017/0344843 A1 * | 11/2017 | Wang | H04N 21/2353 |

OTHER PUBLICATIONS

Written Opinion dated Jul. 25, 2018 in counterpart International Patent Application No. PCT/KR2018/004472.
Extended Search Report dated Dec. 4, 2019 in counterpart European Patent Application No. 18809368.6.

* cited by examiner

ELECTRONIC APPARATUS AND METHOD OF OPERATING THE SAME

CROSS-REFERENCE TO RELATED APPLICATION

This application is based on and claims priority under 35 U.S.C. § 119 to Korean Patent Application No. 10-2017-0068661, filed on Jun. 1, 2017, in the Korean Intellectual Property Office, the disclosure of which is incorporated by reference herein in its entirety.

BACKGROUND

1. Field

The disclosure relates to electronic apparatuses and methods of operating the same, and for example, to an electronic apparatus performing pre-fetching of a content stream, and a method of operating the electronic apparatus.

2. Description of Related Art

Since smart televisions (TVs) or Internet-connected TVs receive data from data networks, such as Internet networks, viewers may receive not only digital broadcasting content, but also multimedia content. As such, the use of various smart devices, such as smart TVs and Internet-connected TVs, enable content providers to provide richer content, advertisements, and interactive content.

Also, recently, as an area of a data streaming service gradually increases through a video-on-demand (VoD) streaming application, each VoD streaming application provides a fast content reproduction change and better user experience using a method of predicting and pre-fetching content to be reproduced next. In particular, the number of applications using the pre-fetching method is gradually increasing since the pre-fetching method is capable of reducing blank time generated due to a reproduction preparing and data processing time while ending a previous image and reproducing a next image.

SUMMARY

An electronic apparatus capable of effectively performing pre-fetching of a content stream, and a method of operating the electronic apparatus are provided.

In accordance with an aspect of the disclosure, an electronic apparatus includes: a communication interface comprising communication interface circuitry; a memory storing at least one instruction; and a processor configured to execute the at least one instruction stored in the memory to cause the electronic apparatus to: determine at least one content stream to be pre-fetched; configure a playback pipeline corresponding to the determined at least one content stream, considering an available resource of the electronic apparatus; pre-fetch the at least one content stream based on the configured playback pipeline; determine whether to update the pre-fetched at least one content stream based on a type of the pre-fetched at least one content stream; and update the pre-fetched at least one content stream at regular time intervals based on a result of the determining of whether to update.

The processor may be further configured to execute the at least one instruction to cause the electronic apparatus to determine to update the pre-fetched at least one content stream when a type of the pre-fetched at least one content stream is live content.

The processor may be further configured to execute the at least one instruction to cause the electronic apparatus to determine a type of the pre-fetched at least one content stream based on at least one of address information of the pre-fetched at least one content stream, meta information included in the pre-fetched at least one content stream, and a content streaming application that requested the pre-fetching.

The processor may be further configured to execute the at least one instruction to cause the electronic apparatus to determine the at least one content stream to be pre-fetched based on at least one of: at least one channel adjacent to a currently selected channel; at least one content item adjacent to a currently focused content item; and at least one content item obtained as a content search result.

The processor may be further configured to execute the at least one instruction to cause the electronic apparatus to: prioritize the at least one content stream to be pre-fetched; and configure a playback pipeline to which the available resource is assigned, for processing a content stream having a high priority.

In accordance with another aspect of the disclosure, a method of operating an electronic apparatus is provided, the method includes: determining at least one content stream to be pre-fetched; configuring a playback pipeline corresponding to the determined at least one content stream, considering an available resource of the electronic apparatus; pre-fetching the at least one content stream based on the configured playback pipeline; determining whether to update the pre-fetched at least one content stream based on a type of the pre-fetched at least one content stream; and updating the pre-fetched at least one content stream at regular time intervals based on a result of the determining of whether to update the pre-fetched at least one content stream.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
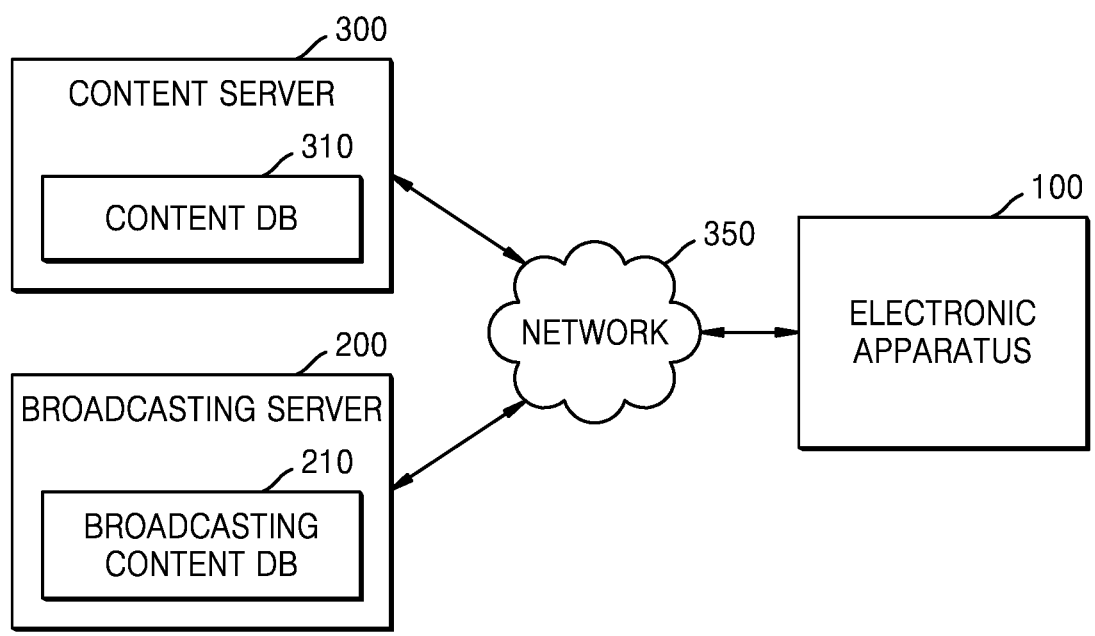
FIG. 1 is a diagram illustrating a network system to which various embodiments are applied.

Hereinafter, the terms used in the disclosure will be briefly defined, and the embodiments will be described in greater detail.

All terms including descriptive or technical terms which are used herein should be construed as having meanings that are apparent to one of ordinary skill in the art. However, the terms may have different meanings according to an intention of one of ordinary skill in the art, precedent cases, or the appearance of new technologies. Also, some terms may be arbitrarily selected, and in this case, the meaning of the selected terms will be described in detail in the detailed description of the disclosure. Thus, the terms used herein have to be defined based on the meaning of the terms together with the description throughout the disclosure.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or may be embodied by any combination of hardware and software.

Example embodiments of the present disclosure will now be described more fully with reference to the accompanying drawings. However, the example embodiments of the present disclosure may be embodied in many different forms, and should not be understood as being limited to the embodiments set forth herein; rather, these example embodiments are provided so that this disclosure will be thorough and complete, and will fully convey the concept of the present disclosure to those of ordinary skill in the art. In the following description, well-known functions or constructions may not be described in detail if they would obscure the example embodiments of the present disclosure with unnecessary detail, and like reference numerals in the drawings denote like or similar elements throughout the disclosure.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating a network system to which various embodiments are applied.

Referring to FIG. 1, the network system may include an electronic apparatus 100, a broadcasting server 200, a content server 300, and a network 350.

The broadcasting server 200 may provide broadcasting content stored in a broadcasting content database (DB) 210 to the electronic apparatus 100 through the network 350.

The content server 300 may provide content stored in a content DB 310 to the electronic apparatus 100 through the network 350.

A network provider, such as the broadcasting server 200 or the content server 300, may include, for example, and without limitation, logic, a circuit, an interface, and/or a code suitable for generating, obtaining, or packaging content, or the like, such as a television (TV) program or multimedia content, to be distributed to the electronic apparatus 100.

The electronic apparatus 100 may receive the broadcasting content from the broadcasting server 200 and display the received broadcasting content, or may receive the content from the content server 300 and display the received content.

The electronic apparatus 100 may include a plurality of resources that decode and render received content streams, and in this regard, may include a pipeline corresponding to at least one content stream by using an available resource from among the plurality of resources, and pre-fetch the at least one content stream.

Also, when the pre-fetched content stream is a live content stream, the electronic apparatus 100 may update the pre-fetched content stream at regular time intervals.

The electronic apparatus 100 may include, for example, and without limitation, logic, a circuit, an interface, and/or a code suitable for receiving content and providing the content to a viewer. The electronic apparatus 100 may be connected to a set top box. The set top box may include, for example, and without limitation, logic, a circuit, an interface, and/or a code, or the like, suitable for connecting the electronic apparatus 100 to an external source, such as a content provider, and converting a signal received from the external source to content displayable on a screen of the electronic apparatus 100.

The electronic apparatus 100 may include, for example, and without limitation, a display apparatus, a set top box connected to the display apparatus, and a pairing apparatus paired with the display apparatus, or the like.

The network 350 may include, for example, and without limitation, logic, a circuit, an interface, and/or a code, or the like, suitable for providing communication between a plurality of entities via various wired or wireless technologies. The wired or wireless technologies may include, for example, and without limitation, T1/E1, DSL, cable modem, FTTx, PLC, and/or WiMax, or the like. The network 350 may include, for example, and without limitation, an Internet or multimedia network, or the like.

Meanwhile, the electronic apparatus 100 according to an embodiment may be a TV, but this is only an example and the electronic apparatus 100 may be any electronic apparatus including a display. For example, and without limitation, the electronic apparatus 100 may be a mobile phone, a tablet personal computer (PC), a digital camera, a camcorder, a laptop computer, a tablet PC, a desktop computer, an electronic book terminal, a digital broadcasting terminal, a personal digital assistant (PDA), a portable multimedia player (PMP), a navigation device, an MP3 player, and/or a wearable device, or the like.

The electronic apparatus 100 may be controlled by a control apparatus, wherein the control apparatus may be any type of apparatus for controlling the electronic apparatus 100, such as a remote controller or a mobile phone. Also, the control apparatus may control the electronic apparatus 100 using near field communication using infrared rays or Bluetooth, or the like, but is not limited thereto.

Figure 2:
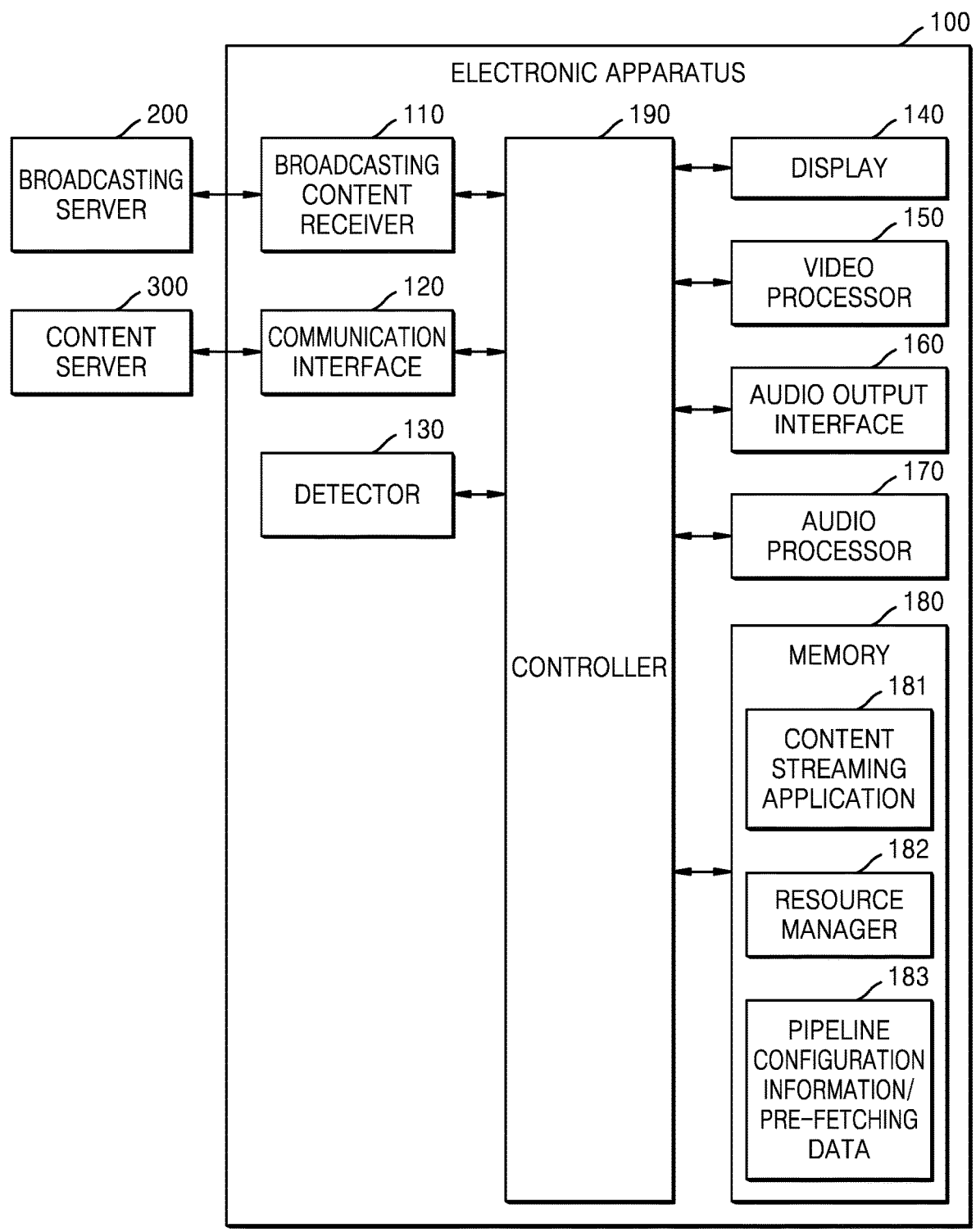
FIG. 2 is a block diagram illustrating an electronic apparatus according to an embodiment.

FIG. 2 is a block diagram illustrating the electronic apparatus 100 according to an embodiment.

Referring to FIG. 2, the electronic apparatus 100 may include a broadcasting content receiver (e.g., including receiver circuitry) 110, a communication interface (e.g., including communication interface circuitry) 120, a detector (e.g., including detector circuitry) 130, a display 140, a video processor (e.g., including video processing circuitry) 150, an audio output interface (e.g., including audio output interface circuitry) 160, an audio processor (e.g., including audio processing circuitry) 170, a memory 180, and a controller (e.g., including processing circuitry) 190.

The broadcasting content receiver 110 may receive the broadcasting content from the broadcasting server 200.

The broadcasting content receiver 110 may include various receiving circuitry, such as, for example, and without limitation, a tuner, or the like. The tuner may process, through, for example, amplification, mixing, or resonance, a broadcast signal received wirelessly or via wires, and tune and select only a frequency of a channel to be received by the electronic apparatus 100 from among radio wave components of several received broadcast signals. The broadcast signal may include, for example, audio, video, and additional information (for example, electronic program guide (EPG)). The tuner may receive a broadcast signal from various sources, such as a terrestrial broadcasting, cable broadcasting, satellite broadcasting, and Internet broadcasting. The tuner may receive a broadcast signal from a source, such as analog broadcasting or digital broadcasting.

The communication interface 120 may include various communication interface circuitry that receive the multimedia content from the content server 300.

The detector 130 may include various detecting circuitry, e.g., sensors, such as, for example, and without limitation, a camera detecting an image of a user, a microphone detecting voice of the user, and/or an optical receiver detecting an interaction of the user, or the like.

The display 140 generates a driving signal by converting an image signal, a data signal, an on-screen display (OSD) signal, or a control signal processed by the video processor 150. The display 140 may be embodied, for example, and without limitation, as a plasma display panel (PDP), a liquid crystal display (LCD), an organic light-emitting display (OLED), or a flexible display, or may be embodied as a 3-dimensional (3D) display, or the like. Also, the display 140 may be configured as a touch screen to be used as an input device as well as an output device.

The video processor 150 may include various circuitry to process an image to be displayed on the display 140, and may perform various image processes on video data, such as, for example, and without limitation, decoding, scaling, noise filtering, frame rate converting, and/or resolution converting, or the like.

According to an embodiment, the video processor 150 may include a plurality of decoders and a plurality of renderers. In the present disclosure, the decoder or renderer may be referred to as a resource, and an available resource may be configured as a pipeline.

Operations of the video processor 150 will be described in greater detail below with reference to FIG. 3.

The audio output interface 160 may include various audio output circuitry to output an audio signal. The audio output interface 160 may include, for example, and without limitation, at least one of or a combination of a speaker, a headphone output terminal, and/or a Sony/Philips Digital Interface (S/PDIF) output terminal, or the like.

The audio processor 170 may include various audio processing circuitry to process an audio signal output from the audio output interface 160.

The audio processor 170 performs a process on audio data. The audio processor 170 may perform various processes on the audio data, such as, for example, and without limitation, decoding, amplifying, and/or noise filtering, or the like. Meanwhile, the audio processor 170 may include a plurality of audio processing modules to process audio corresponding to a plurality of pieces of content.

According to an embodiment, the audio processor 170 may include a plurality of decoders like the video processor 150, and use an audio decoder as an available resource while configuring a pipeline corresponding to at least one content stream.

The memory 180 may include data processed by an operating system (OS), at least one application, and the controller 190.

The term "memory" includes a storage unit, a read-only memory (ROM) and/or a random access memory (RAM) of a controller, or a memory card (for example, a micro security digital (SD) card or a universal serial bus (USB) memory) mounted on the electronic apparatus 100. Also, the memory 180 may include a nonvolatile memory, a volatile memory, a hard disk drive (HDD), or a solid state drive (SSD).

According to an embodiment, the memory 180 may include a content streaming application 181, a resource manager 182, and a pipeline configuration information/pre-fetching data 183.

The content streaming application 181 may include at least one instruction for displaying content on the display 140 by streaming the content from the content server 300, determining at least one content stream to be pre-fetched, configuring a playback pipeline corresponding to each of the at least one content stream considering an available resource of the electronic apparatus 100, pre-fetching the at least one content stream according to the playback pipeline, determining whether to maintain or update the pre-fetched at least one content stream based on a type of the pre-fetched at least one content stream, and updating the pre-fetched at least one content stream at regular time intervals based on a result of the determining whether to maintain or update.

The resource manager 182 may include at least one instruction for determining an available resource included in the video processor 150, and managing the available resource.

The pipeline configuration information/pre-fetching data 183 includes pipeline configuration information determined by the content streaming application 181 and pre-fetched content data.

The controller 190 may include various processing circuitry and performs functions of controlling overall operations of the electronic apparatus 100 and a signal flow between internal components of the electronic apparatus 100, and processing data. The controller 190 may execute an OS and various applications stored in the memory 180 in response to a user input or when a pre-set and stored condition is satisfied.

The controller 190 may include a RAM storing a signal or data input from outside the electronic apparatus 100 or used as a storage region corresponding to various operations performed by the electronic apparatus 100, and a ROM and a processor storing control programs for controlling the electronic apparatus 100 are stored.

According to an embodiment, the controller 190 may execute at least one instruction included in the content streaming application 181 or at least one instruction included in the resource manager 182 stored in the memory 180.

According to an embodiment, the controller 190 may execute the content streaming application 181 to determine at least one content stream to be pre-fetched, configure a playback pipeline corresponding to the determined at least one content stream considering an available resource of the electronic apparatus 100, pre-fetch the at least one content stream according to the configured playback pipeline, determine whether to maintain or update the pre-fetched at least one content stream based on a type of the pre-fetched at least one content stream, and update the pre-fetched at least one content stream at regular time intervals based on a result of the determining of whether to maintain or update.

According to an embodiment, the controller 190 may update the pre-fetched at least one content stream when a type of the pre-fetched at least one content stream is live content.

According to an embodiment, the controller 190 may determine the type of the pre-fetched at least one content stream based on at least one of address information of the pre-fetched at least one content stream, meta information included in the pre-fetched at least one content stream, and the content streaming application 181 that requested the pre-fetching.

Also, according to an embodiment, the controller 190 may determine the at least one content stream to be pre-fetched based on at least one of: at least one channel adjacent to a currently selected channel; at least one content item adjacent to a currently focused content item; and at least one content item obtained as a content search result.

Also, according to an embodiment, the controller 190 may prioritize the at least one content stream to be pre-fetched, and configure a playback pipeline to which the available resource is assigned, in correspondence with a content stream having a high priority.

The electronic apparatus 100 may further include, in addition to components illustrated in FIG. 2, an input/output unit receiving video, audio, and additional information from outside the electronic apparatus 100, and various sensors.

Also, the electronic apparatus 100 is not limited, and may be any electronic apparatus, such as a laptop computer, a smart phone, a tablet PC, a wearable device, and/or a PDA, or the like, as long as it includes a processor and a memory and executes an application.

Meanwhile, the electronic apparatus 100 of FIG. 2 is only an example. The components illustrated in FIG. 2 may be combined or omitted, or another component may be added according to the specification of the electronic apparatus 100 that is actually implemented. In other words, two or more components may be combined to one component or one component may be sub-divided into two or more components as occasion demands. Also, functions performed by each component are for describing embodiments, and detailed operations do not limit the scope of the disclosure.

Figure 3:
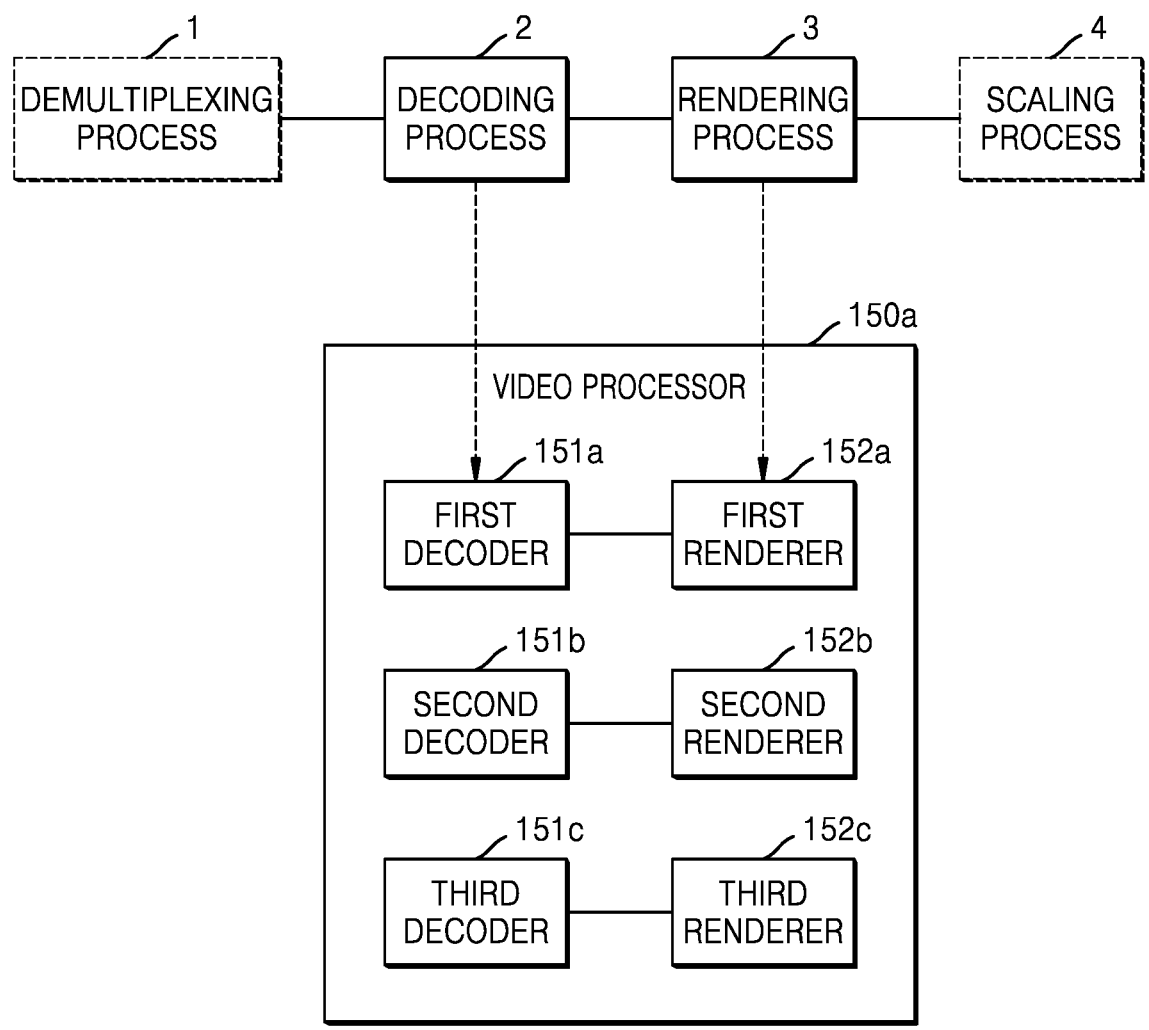
FIG. 3 is a diagram illustrating a configuration of an example of a video processor of FIG. 2.

FIG. 3 is a diagram illustrating a configuration of an example of the video processor 150 of FIG. 2. Here, a video processor 150*a* is shown as the example of the video processor 150.

A content stream received by the electronic apparatus 100 may be displayed on the display 140 after the video processor 150*a* performs a demultiplexing process 1, a decoding process 2, a rendering process 3, and a scaling process 4 on the content stream.

The demultiplexing process 1 may, for example, be a process in which a received content stream is parsed and multiplexed streams are separated. The demultiplexing process 1 may be embodied in a hardware resource or a software resource.

The decoding process 2 may, for example, be a process in which a demultiplexed stream is decoded, and may be embodied in a hardware resource or a software resource.

The rendering process 3 may, for example, be a process in which a decoded stream is configured as a screen image displayable on the display 140, and may be embodied in a hardware resource or a software resource.

The scaling process 4 may, for example, be a process in which decoded or rendered data is adjusted to characteristics of the display 140, and may be embodied in a hardware resource or a software resource. The rendering process 3 and the scaling process 4 may be integrated into one process or the scaling process 4 may be omitted.

Referring to FIG. 3, the video processor 150*a* may include, for example, three decoders and three renderers. In other words, the video processor 150*a* may include first through third decoders 151*a*, 151*b* and 151*c* and first through third renderers 152*a*, 152*b* and 152*c*. In FIG. 3, the video processor 150*a* includes the first through third decoders 151*a* through 151*c* and the first through third renderers 152*a* through 152*c*, but alternatively, the video processor 150*a* may include a demultiplexer and a scaler as hardware resources.

Figure 4:
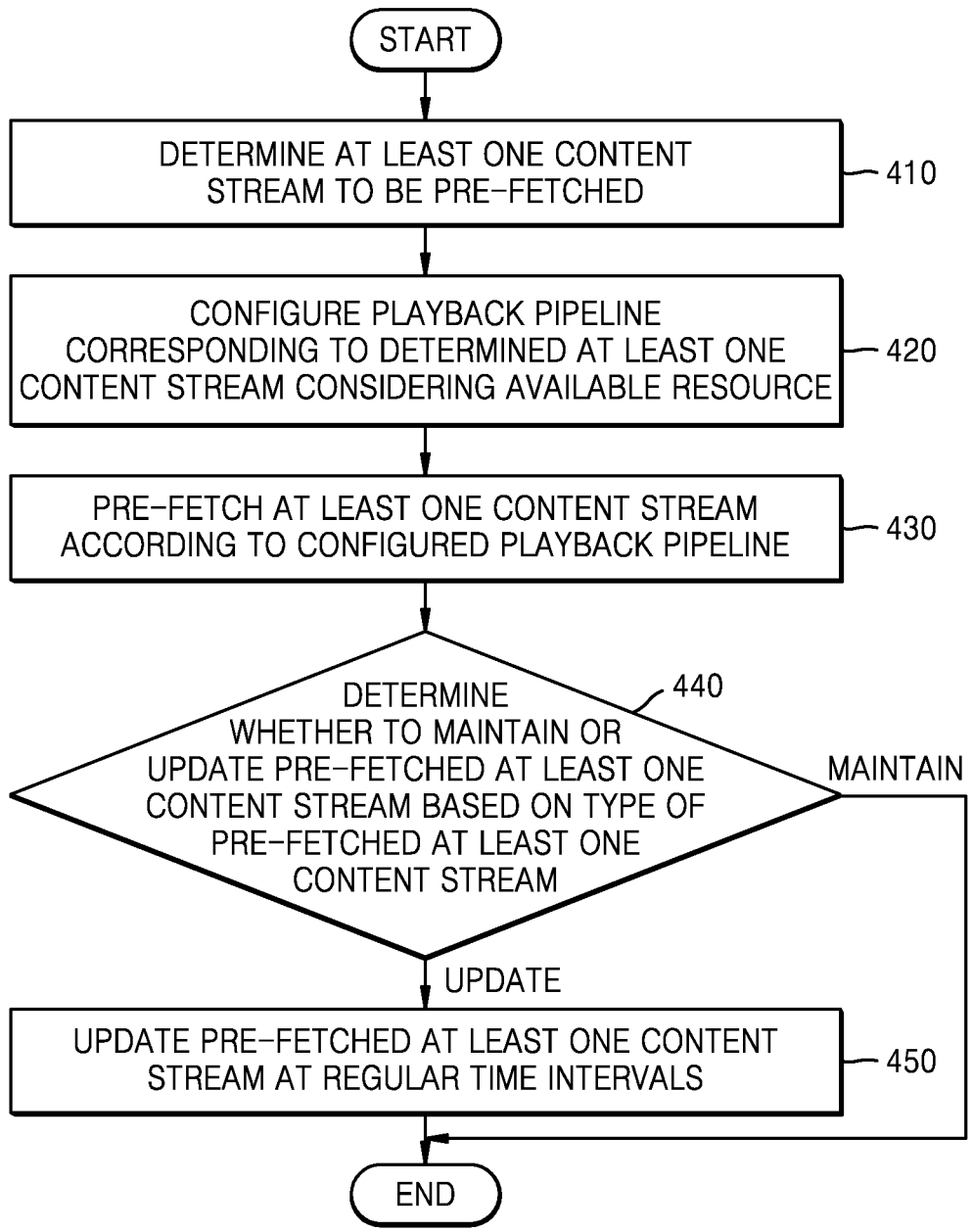
FIG. 4 is a flowchart illustrating a method of operating an electronic apparatus, according to an embodiment.

FIG. 4 is a flowchart illustrating an example method of operating the electronic apparatus 100, according to an embodiment.

Referring to FIG. 4, in operation 410, the electronic apparatus 100 may determine at least one content stream to be pre-fetched.

The controller 190 of the electronic apparatus 100 may determine the at least one content stream to be pre-fetched by executing the content streaming application 181.

The controller 190 may determine, as the at least one content stream to be pre-fetched, a content stream having a high possibility to be selected next by a user.

The controller 190 may select, as the at least one content stream to be pre-fetched, a content stream having a high possibility to be selected by the user based on a user interface (UI) type.

According to an embodiment, the controller 190 may select, as the at least one content stream to be pre-fetched, at least one content stream corresponding to a channel adjacent to a channel currently displayed on the display 140, when the UI type is a channel mode UI type.

Figure 5:
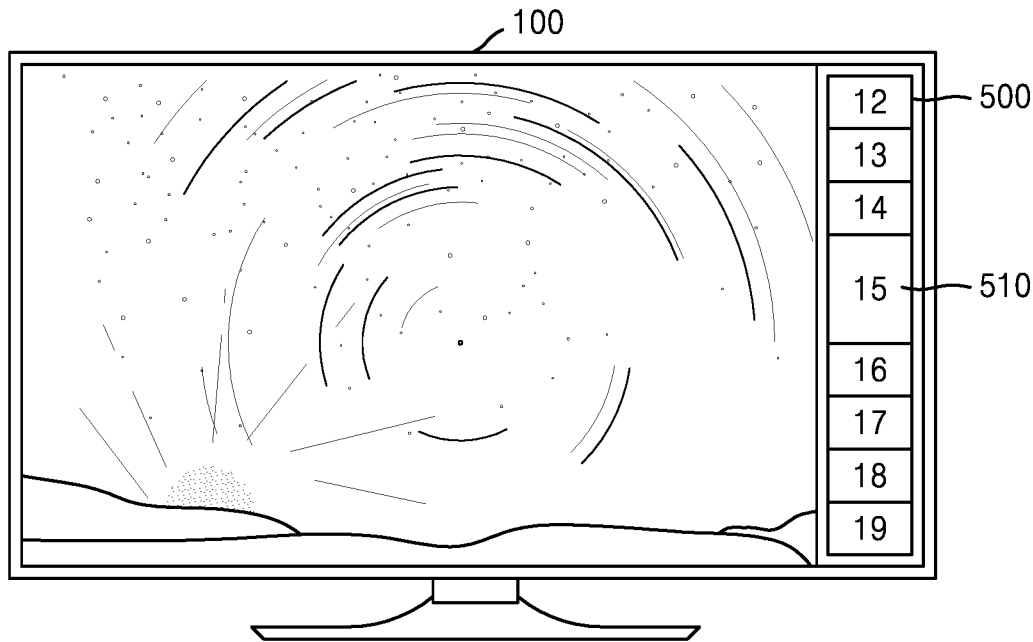
FIG. 5 is a diagram illustrating an example of a channel changing method in an electronic apparatus.

FIG. 5 is a diagram illustrating an example of a channel changing method in the electronic apparatus 100.

In FIG. 5, the electronic apparatus 100 displays content of a channel <15> 510, and a channel list 500 is displayed on a right region of the electronic apparatus 100. At this time, content that is highly likely to be reproduced next may be channels adjacent to the channel <15> 510 or a channel that has been most viewed. Accordingly, the controller 190 may determine content streams to be pre-fetched by assigning a high weight to channels adjacent to a current channel in two directions, and assigning a next high weight to next adjacent channels.

According to an embodiment, the controller 190 may determine, as the at least one content stream to be pre-fetched, at least one content stream adjacent to a currently focused content item, when the UI type is a content list mode UI type.

Figure 6:
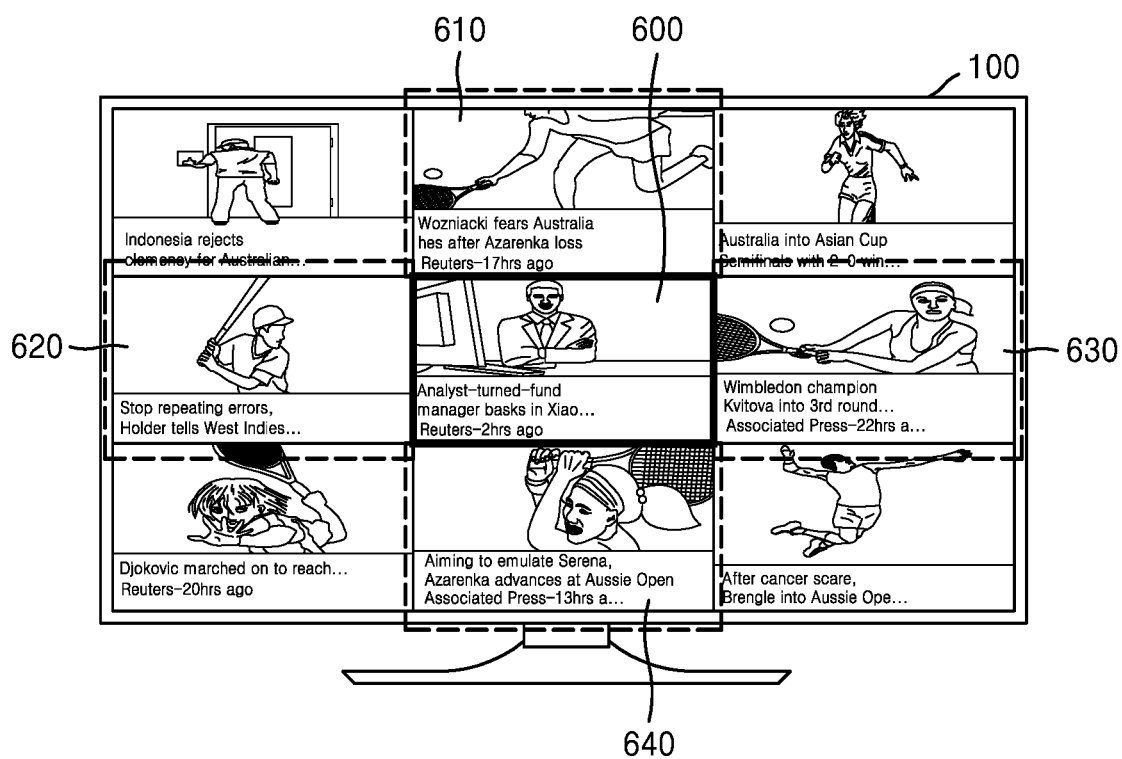
FIG. 6 is a diagram illustrating an example of a content item listing method in an electronic apparatus.

FIG. 6 illustrates an example of a content item listing method in the electronic apparatus 100. The electronic apparatus 100 of FIG. 6 displays an application in which thumbnails or content items are listed. Here, a content stream corresponding to a focused content item 600 is highly likely to be reproduced, and then an upper item 610, a left item 620, a right item 630, and a lower item 640 adjacent to the focused content item 600 are highly likely to be reproduced. Accordingly, the controller 190 may determine at least one content stream to be pre-fetched by varying weights applied to the focused content item 600 and the upper, left, right, and lower items 610 through 640.

According to an embodiment, the controller 190 may determine, as the at least one content stream to be pre-fetched, at least one content stream in a search result list, when the UI type is a content search UI type.

Figure 7:
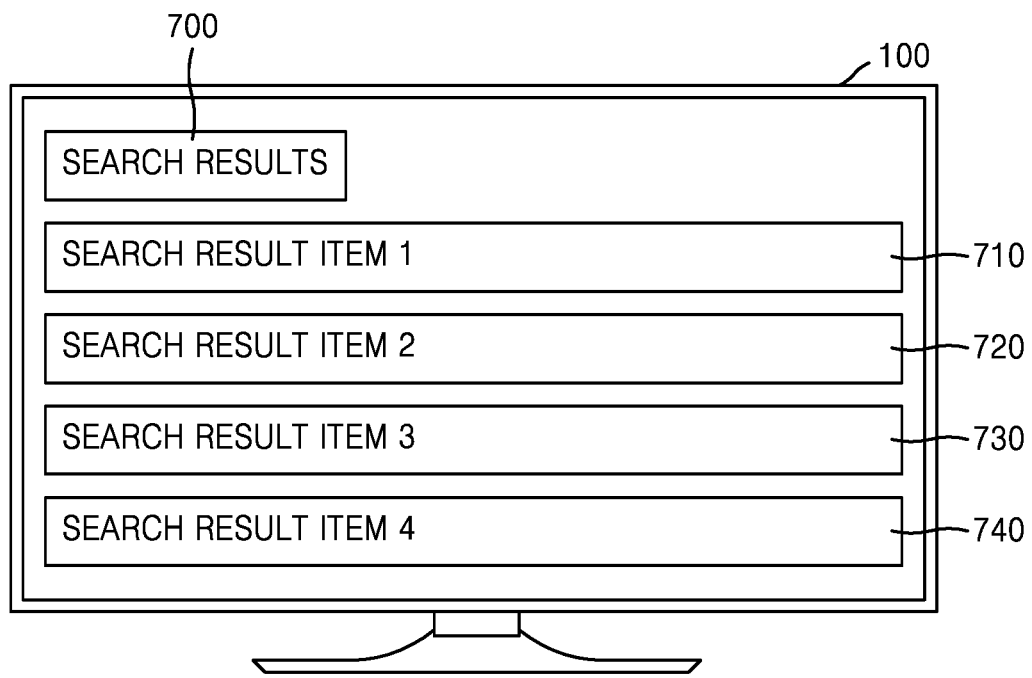
FIG. 7 is a diagram illustrating an example of displaying a list of search results in an electronic apparatus.

FIG. 7 is a diagram illustrating an example of displaying a list of search results in the electronic apparatus 100.

The electronic apparatus 100 of FIG. 7 displays a search result UI 700, and displays, as search results, first through fourth search result items 710 through 740. When the user finds content via a search, content in a list of search results is highly likely to be reproduced, and thus the controller 190 may determine at least one content stream to be pre-fetched by assigning a high weight to content having a high priority in the list of search results.

Referring back to FIG. 4, in operation 420, the electronic apparatus 100 may configure a playback pipeline corresponding to the determined at least one content stream considering an available resource.

In operation 430, the electronic apparatus 100 may pre-fetch the at least one content stream according to the configured playback pipeline.

The controller 190 may perform operations 420 and 430 separately or at the same time, and hereinafter, operations 420 and 430 are described together.

The controller 190 may pre-configure a playback pipeline such that a content stream is pre-fetched and prepared to be displayed.

The controller 190 configures a playback pipeline corresponding to at least one content stream to be pre-fetched considering an available resource, and at this time, the available resource may be assigned according to a weight or priority of the at least one content stream. The controller 190 may assign a hardware resource among available resources from a content stream having a high priority. For example, when resources include a software demultiplexer, a hardware decoder, and a hardware renderer, a playback pipeline assigned from the software demultiplexer to the hardware renderer may be configured when a content stream has a high priority, and a software resource may be assigned without a hardware resource when a content stream has a low priority. As such, when a playback pipeline is pre-configured, faster content conversion may be provided since it is possible to reduce time for pre-storing a content stream and time for configuring a playback pipeline.

Figure 8:
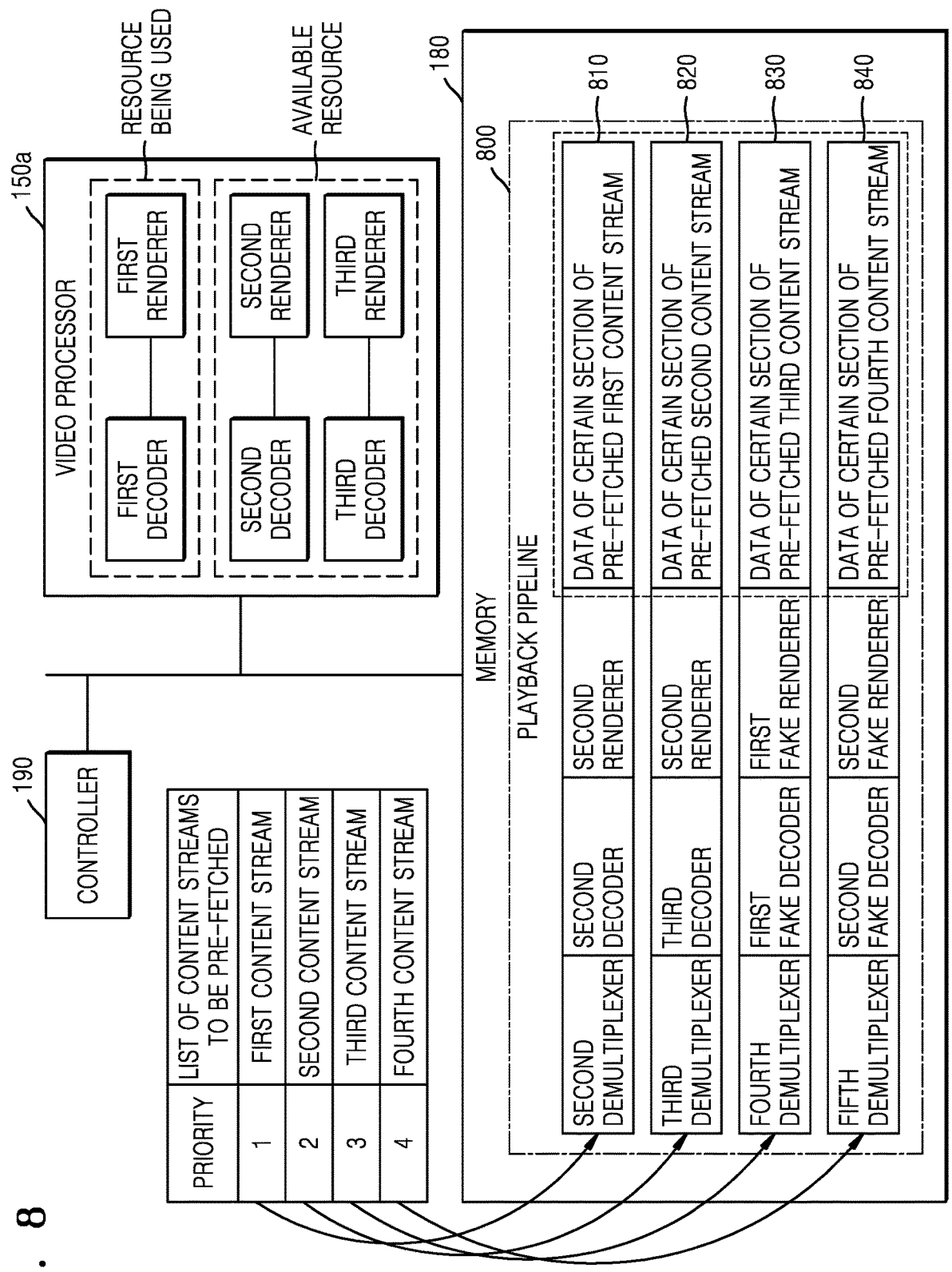
FIG. 8 is a diagram illustrating a pipeline structure according to an embodiment.

FIG. 8 is a diagram illustrating an example pipeline structure according to an embodiment.

Referring to FIG. 8, the video processor 150a includes three decoders and three renderers as resources. Here, a first decoder and a first renderer are resources that are already being used, and second and third decoders and second and third renderers are available resources.

The controller 190 may determine first through fourth content streams as content streams to be pre-fetched, and prioritize the first through fourth content streams respectively from 1 to 4.

The controller 190 may configure a playback pipeline by assigning an available resource from a content stream having a highest priority. Accordingly, the controller 190 may store playback pipelines 800 in a portion of the memory 180. The controller 190 may configure a playback pipeline 810 to which a second demultiplexer, a second decoder, and a second renderer are assigned in correspondence with the first content stream having highest priority, and configure a playback pipeline 820 to which a third demultiplexer, a third decoder, and the second renderer are assigned in correspondence with the second content stream having a second highest priority. The controller 190 may configure a playback pipeline 830 to which a fourth demultiplexer, a first fake decoder, and a first fake renderer are assigned in correspondence with the third content stream having a third highest priority, since there is no available source. Then, the controller 190 may configure a playback pipe 840 to which a fifth demultiplexer, a second fake decoder, and a second fake renderer are assigned in correspondence with the fourth content stream. A fake decoder and a fake renderer are not actual resources that are assigned, but are null values. Also, the controller 190 may pre-fetch and store a content stream corresponding to each playback pipeline.

Figure 9:
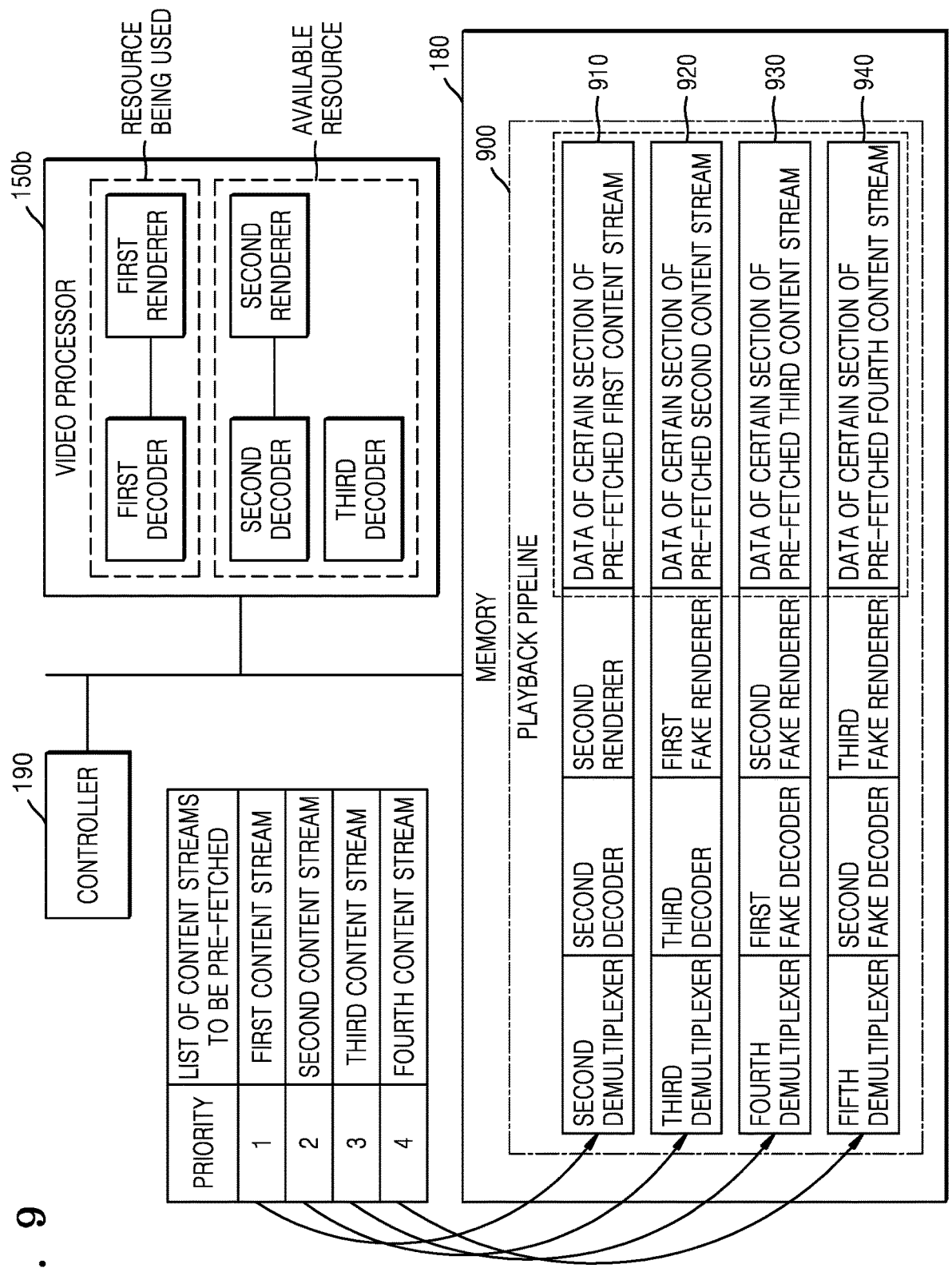
FIG. 9 is a diagram illustrating a pipeline structure according to another embodiment.

FIG. 9 is a diagram illustrating an example pipeline structure according to another embodiment.

Referring to FIG. 9, the video processor 150b includes three decoders and two renderers as resources. Here, a first decoder and a first renderer are resources that are already being used, and second and third decoders and a second and renderer are available resources.

The controller 190 may determine first through fourth content streams as content streams to be pre-fetched, and prioritize the first through fourth content streams respectively from 1 to 4.

The controller 190 may configure a playback pipeline by assigning an available resource from a content stream having a highest priority. Accordingly, the controller 190 may store playback pipelines 900 in a portion of the memory 180. The controller 190 may configure a playback pipeline 910 to which a second demultiplexer, a second decoder, and a second renderer are assigned in correspondence with the first content stream having highest priority, and configure a playback pipeline 920 to which a third demultiplexer, a third decoder, and a first fake renderer are assigned in correspondence with the second content stream having a second highest priority. The controller 190 may configure a playback pipeline 930 to which a fourth demultiplexer, a first fake decoder, and a second fake renderer are assigned in correspondence with the third content stream having a third highest priority, since there is no available source. Then, the controller 190 may configure a playback pipe 940 to which a fifth demultiplexer, a second fake decoder, and a third fake renderer are assigned in correspondence with the fourth content stream. Also, the controller 190 may pre-fetch and store a content stream corresponding to each playback pipeline.

Referring back to FIG. 4, in operation 440, the electronic apparatus 100 may determine whether to maintain or update the pre-fetched at least one content stream based on a type of the pre-fetched at least one content stream.

The electronic apparatus 100 may determine the type of the pre-fetched at least one content stream based on at least one of address information of the pre-fetched at least one content stream requested during the pre-fetching, meta information included in the pre-fetched at least one content stream, and the content streaming application 181 that requested the pre-fetching.

When the pre-fetched at least one content stream is not live, the pre-fetched at least one content stream is not required to be updated, but when the pre-fetched at least one content stream is live, the pre-fetched at least one content stream needs to be periodically updated.

When the type of the pre-fetched at least one content stream is live content, the electronic apparatus 100 may update the pre-fetched at least one content stream and perform operation 450.

When the type of the pre-fetched at least one content stream is not live content, the electronic apparatus 100 may determine to maintain the pre-fetched at least one content stream.

When a type of a content stream pre-fetched in the memory 180 is live content, the pre-fetched content stream is no longer a latest content stream after a certain period of time due to characteristics of a live content stream, and thus the pre-fetched content stream is unable to be used even when selected during content conversion. Accordingly, a content stream stored in a playback pipeline may be updated at regular time intervals so as to perform a function of pre-fetching while maintaining characteristics of live-streaming playback.

In operation 450, the electronic apparatus 100 may update the pre-fetched at least one content stream at regular time intervals.

In case of live-streaming, the electronic apparatus 100 may receive a content stream of a certain section before a current point of time, from the content server 300.

Figure 10:
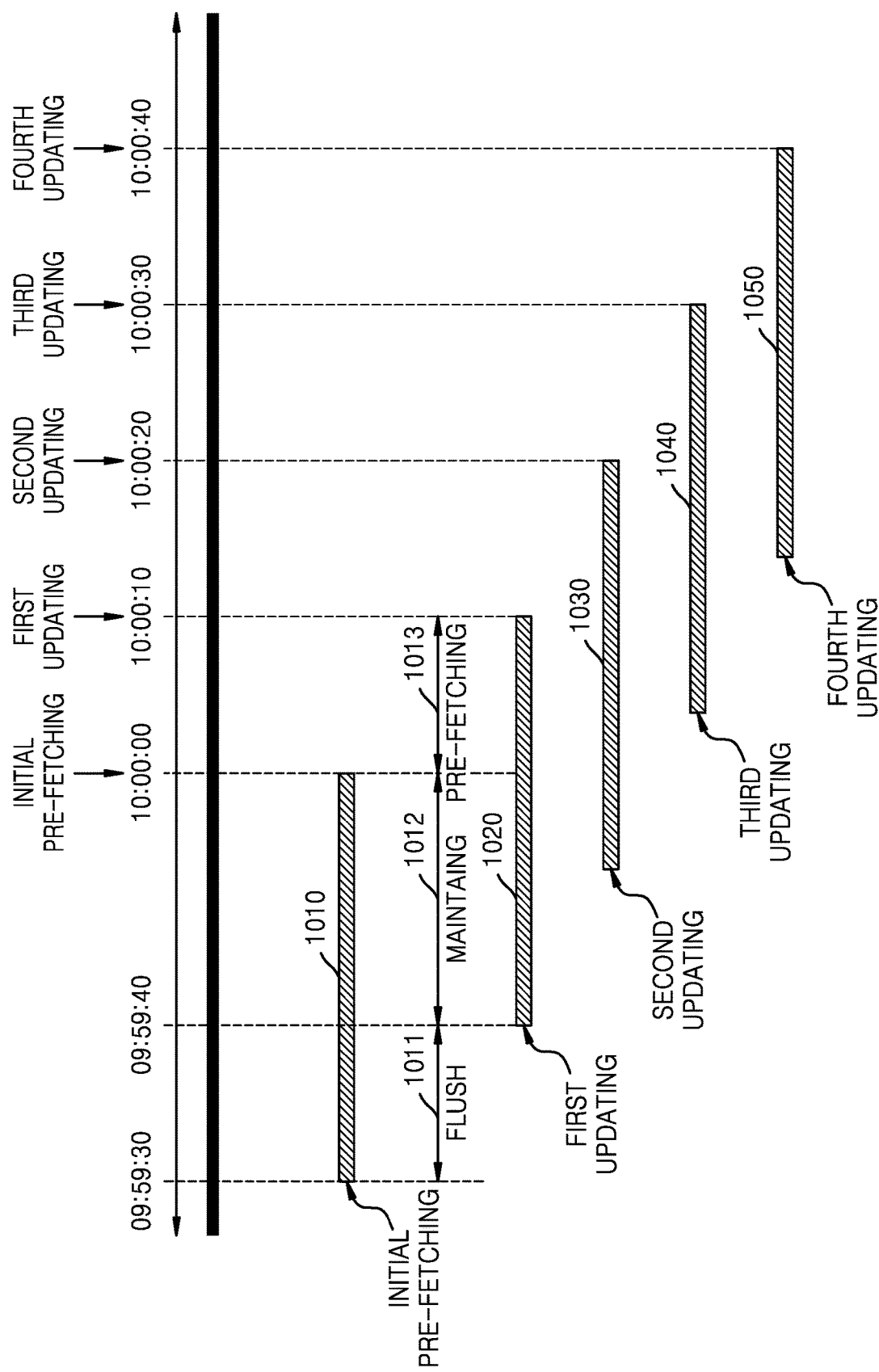
FIG. 10 is a diagram illustrating updating of a pre-fetched content stream.

FIG. 10 is a diagram illustrating an example of updating of a pre-fetched content stream.

Referring to FIG. 10, the controller 190 may perform initial pre-fetching at, for example, 10:00:00. A pre-fetched content stream may be a content stream 1010 from 09:59:30 to 10:00:00, which corresponds to content of the 30-second period before the initial pre-fetching. When an update interval is set to 10 seconds, the controller 190 may update a content stream 1020 from 09:59:40 to 10:00:10 at 10:00:10. During first updating, the controller 190 may flush a content stream 1011, maintain a content stream 1012, and pre-fetch a content stream 1013 from 10:00:00 to 10:00:10.

The controller 190 may perform second updating 1030 at 10:00:20, third updating 1040 at 10:00:30, and fourth updating 1050 at 10:00:40 in the similar manner.

Figure 11:
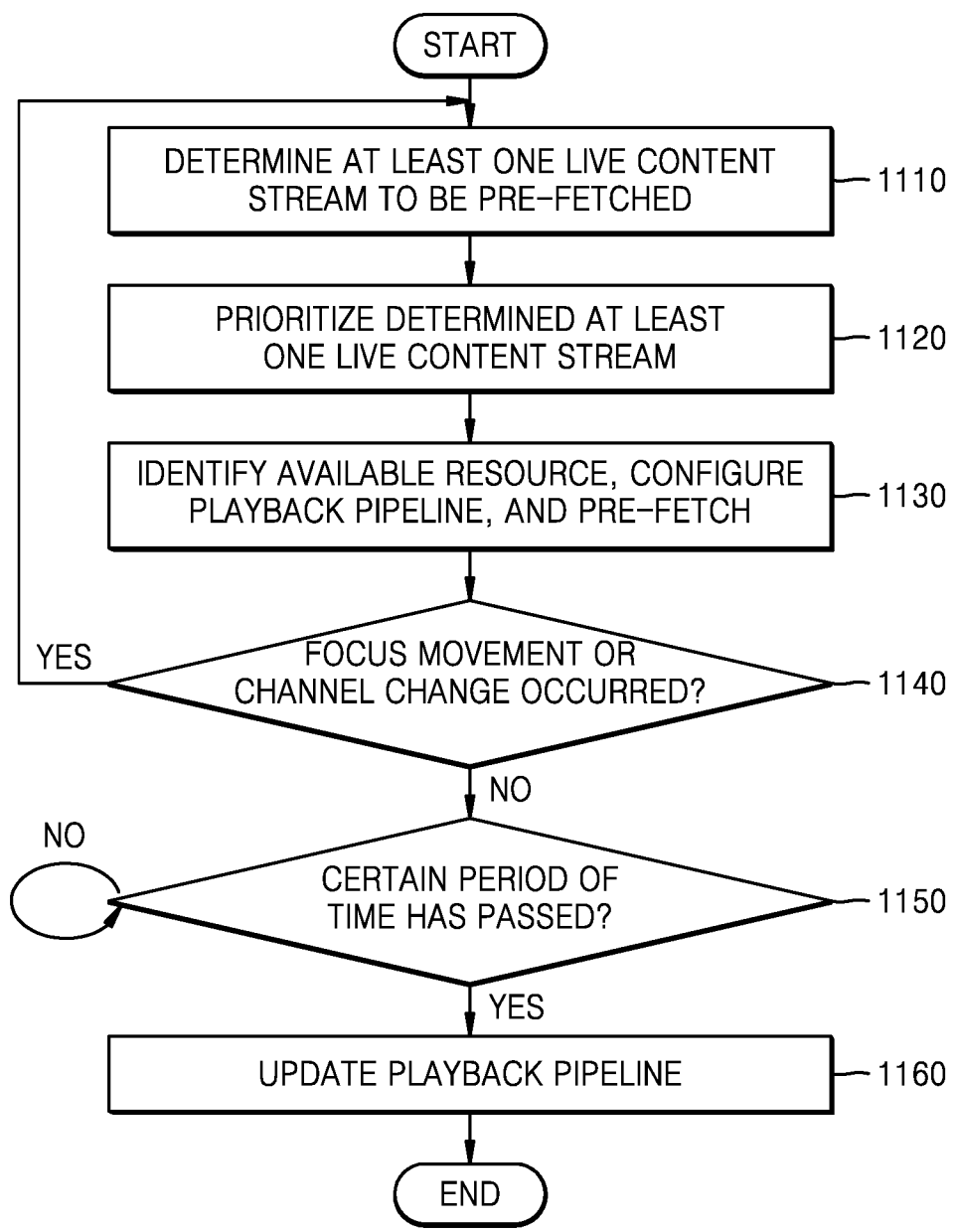
FIG. 11 is a flowchart illustrating a method of operating an electronic apparatus, according to another embodiment.

FIG. 11 is a flowchart illustrating an example method of operating the electronic apparatus 100, according to another embodiment.

Referring to FIG. 11, the electronic apparatus 100 may determine at least one live content stream to be pre-fetched, in operation 1110.

In operation 1120, the electronic apparatus 100 may prioritize the determined at least one live content stream.

In operation 1130, the electronic apparatus 100 identifies an available resource, configures a playback pipeline according to determined priorities, and pre-fetch a corresponding live content stream.

In operation 1140, the electronic apparatus 100 may determine whether a focus movement or channel change has occurred. When it is determined that the focus movement or channel change has occurred, operation 1110 may be performed.

When it is determined that the focus movement or channel change has not occurred, the electronic apparatus 100 determines whether a certain period of time has passed after the at least one live content stream is pre-fetched, in operation 1150.

When it is determined that the certain period of time has passed, the electronic apparatus 100 may update the payback pipeline in operation 1160.

According to an example embodiment, an electronic apparatus and a method of operating the same, user experience may be enhanced by reducing a gap occurred during content conversion, and in addition, content conversion of live content streams may be effectively performed.

The methods described above may be recorded on a computer-readable recording medium by being realized in computer programs executed by using various computers. The computer-readable recording medium may include at least one of a program command, a data file, and a data structure. The program commands recorded in the computer-readable recording medium may be specially designed or well known to one of ordinary skill in the computer software field. Examples of the computer-readable recording medium include read-only memory (ROM), random-access memory (RAM), CD-ROMs, magnetic tapes, floppy disks, optical data storage devices, etc. Examples of the computer command include mechanical codes prepared by a compiler, and high-level languages executable by a computer using an interpreter.

While various example embodiments have been described with reference to the figures, it will be understood by those of ordinary skill in the art that various changes in form and details may be made therein without departing from the spirit and scope as defined by the following claims.

What is claimed is:

1. An electronic apparatus comprising:
a communication interface comprising communication interface circuitry;
a memory storing at least one instruction; and
a processor, wherein the processor is configured to execute the at least one instruction stored in the memory to cause the electronic apparatus to:
determine at least one content stream to be pre-fetched;
configure a playback pipeline corresponding to the determined at least one content stream considering an available resource of the electronic apparatus;
pre-fetch the at least one content stream based on the configured playback pipeline;
determine whether to update the pre-fetched at least one content stream based on a type of the pre-fetched at least one content stream; and
update the pre-fetched at least one content stream at regular time intervals based on a result of the determining of whether to update.

2. The electronic apparatus of claim 1, wherein the processor is further configured to execute the at least one instruction to cause the electronic apparatus to determine to update the pre-fetched at least one content stream when a type of the pre-fetched at least one content stream is live content.

3. The electronic apparatus of claim 1, wherein the processor is further configured to execute the at least one instruction to cause the electronic apparatus to determine a type of the pre-fetched at least one content stream based on at least one of: address information of the pre-fetched at least one content stream, meta information included in the pre-fetched at least one content stream, and a content streaming application that requested the pre-fetching.

4. The electronic apparatus of claim 1, wherein the processor is further configured to execute the at least one instruction to cause the electronic apparatus to determine the at least one content stream to be pre-fetched based on at least one of: at least one channel adjacent to a currently selected channel; at least one content item adjacent to a currently focused content item; and at least one content item obtained as a content search result.

5. The electronic apparatus of claim 1, wherein the processor is further configured to execute the at least one instruction to cause the electronic apparatus to:
prioritize the at least one content stream to be pre-fetched; and
configure a playback pipeline to which the available resource is assigned, for processing a content stream having a high priority.

6. A method of operating an electronic apparatus, the method comprising:
determining at least one content stream to be pre-fetched;
configuring a playback pipeline corresponding to the determined at least one content stream considering an available resource of the electronic apparatus;

pre-fetching the at least one content stream based on the configured playback pipeline;

determining whether to update the pre-fetched at least one content stream based on a type of the pre-fetched at least one content stream; and updating the pre-fetched at least one content stream at regular time intervals based on a result of the determining of whether to update the pre-fetched at least one content stream.

7. The method of claim 6, wherein the determining of whether to update the pre-fetched at least one content stream comprises determining to update the pre-fetched at least one content stream when a type of the pre-fetched at least one content stream is live content.

8. The method of claim 6, wherein the determining of whether to update the pre-fetched at least one content stream comprises determining a type of the pre-fetched at least one content stream based on at least one of: address information of the pre-fetched at least one content stream, meta information included in the pre-fetched at least one content stream, and a content streaming application that requested the pre-fetching.

9. The method of claim 6, further comprising determining the at least one content stream to be pre-fetched based on at least one of: at least one channel adjacent to a currently selected channel; at least one content item adjacent to a currently focused content item; and at least one content item obtained as a content search result.

10. The method of claim 6, further comprising:

prioritizing the at least one content stream to be pre-fetched; and configuring a playback pipeline to which the available resource is assigned, for processing a content stream having a high priority.

11. A non-transitory computer-readable recording medium having recorded thereon a computer program which, when executed by a computer, causes an electronic device to perform at least one operation comprising:

determining at least one content stream to be pre-fetched;

configuring a playback pipeline corresponding to the determined at least one content stream considering an available resource of the electronic apparatus;

pre-fetching the at least one content stream based on the configured playback pipeline;

determining whether to update the pre-fetched at least one content stream based on a type of the pre-fetched at least one content stream; and updating the pre-fetched at least one content stream at regular time intervals based on a result of the determining of whether to update the pre-fetched at least one content stream.

* * * * *